(12) United States Patent
Fujitake

(10) Patent No.: US 8,294,415 B2
(45) Date of Patent: Oct. 23, 2012

(54) CHARGING SYSTEM AND METHOD FOR OPERATING THE SAME

(75) Inventor: Yoshinori Fujitake, Nishikamo-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 243 days.

(21) Appl. No.: 12/682,861

(22) PCT Filed: Sep. 2, 2008

(86) PCT No.: PCT/JP2008/065714
§ 371 (c)(1),
(2), (4) Date: Apr. 13, 2010

(87) PCT Pub. No.: WO2009/069357
PCT Pub. Date: Jun. 4, 2009

(65) Prior Publication Data
US 2010/0225274 A1    Sep. 9, 2010

(30) Foreign Application Priority Data

Nov. 29, 2007  (JP) .................................. 2007-309143

(51) Int. Cl.
*H01M 10/46* (2006.01)
(52) U.S. Cl. ........................................................ 320/104
(58) Field of Classification Search .................. 320/107, 320/109
See application file for complete search history.

(56) References Cited

U.S. PATENT DOCUMENTS

| 5,202,617 A | 4/1993 | Nor |
| 5,596,258 A | 1/1997 | Kimura et al. |
| 5,633,577 A * | 5/1997 | Matsumae et al. ............. 320/104 |
| 7,489,048 B2 * | 2/2009 | King et al. ..................... 320/104 |
| 2007/0159007 A1 * | 7/2007 | King et al. ........................ 307/71 |

FOREIGN PATENT DOCUMENTS

| DE | 42 13 405 C2 | 10/1993 |
| JP | A-5-95607 | 4/1993 |
| JP | U-6-2944 | 1/1994 |
| JP | A-6-343202 | 12/1994 |
| JP | A-7-298502 | 11/1995 |
| JP | A-10-304582 | 11/1998 |
| JP | A-11-205909 | 7/1999 |
| RU | 2 072 605 C1 | 1/1997 |
| RU | 2 222 098 C2 | 1/2004 |

OTHER PUBLICATIONS

Office Action issued in Russian Application No. 2010126485/11(037718) dated Jul. 6, 2011 (w/ English Translation).
International Search Report issued in International Application No. PCT/JP2008/065714 on Nov. 18, 2008 (with Engl-lang translation).

* cited by examiner

*Primary Examiner* — Edward Tso
(74) *Attorney, Agent, or Firm* — Oliff & Berridge, PLC

(57) ABSTRACT

An HV_ECU executes a program including a step of determining whether a charging cable is connected to a power supply external to the vehicle when a connector signal CNCT output in the case where the charging cable is connected to an inlet of the vehicle is input to the vehicle; and a step of determining whether a malfunction occurs in a charger mounted in the vehicle when the charging cable is not connected to the power supply.

12 Claims, 9 Drawing Sheets

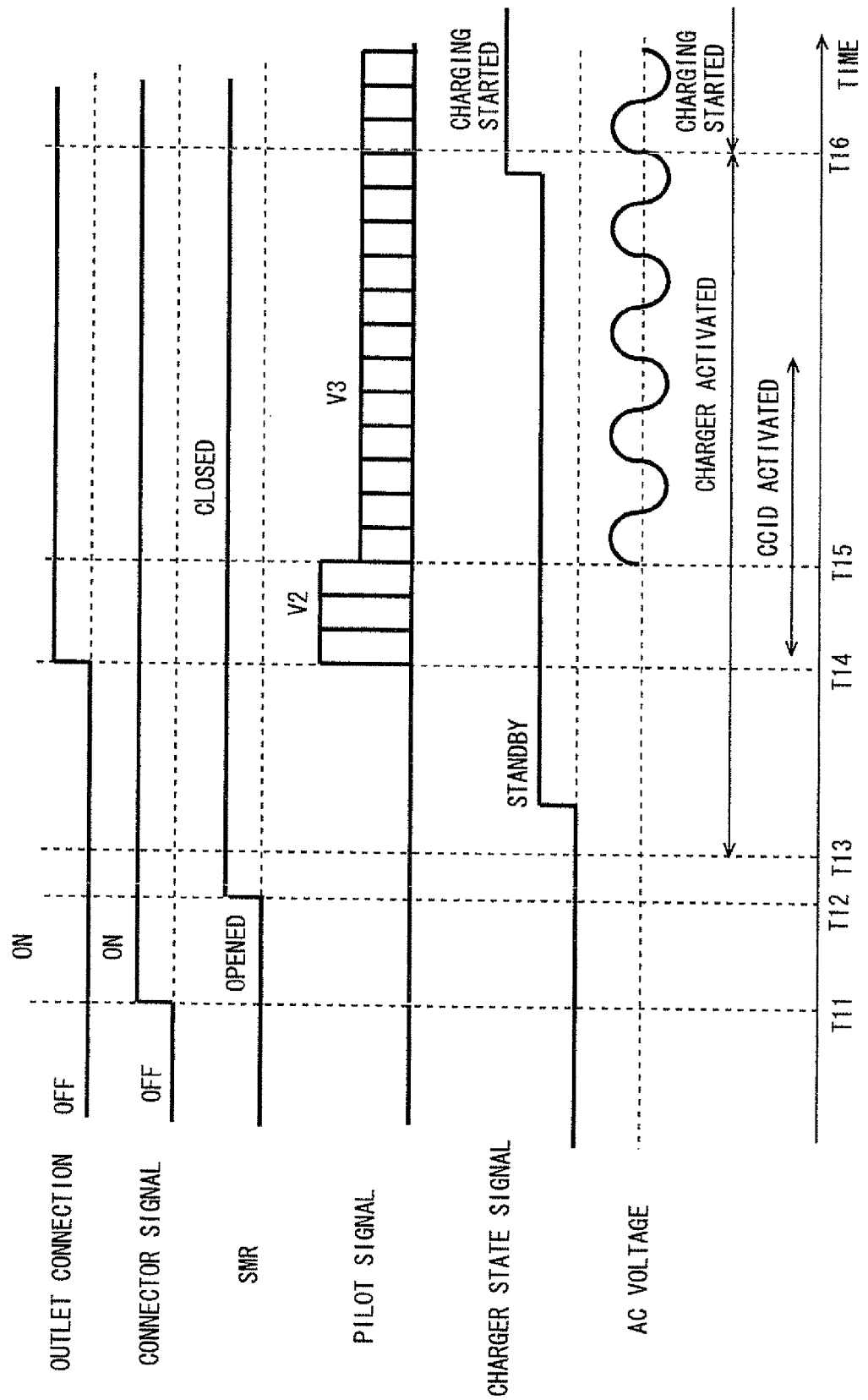

CHARGING SYSTEM AND METHOD FOR OPERATING THE SAME

TECHNICAL FIELD

The present invention relates to a charging system and a method for operating the same, and particularly to a charging system for supplying, to a power storage mechanism mounted in a vehicle, electric power supplied from a power supply external to the vehicle through a coupling instrument, and a method for operating the charging system.

BACKGROUND ART

Conventionally, a vehicle such as a hybrid vehicle, an electric vehicle and a fuel-cell vehicle using an electric motor as a driving source has been known. Such a vehicle is provided with a power storage mechanism such as a battery for storing electric power supplied to the electric motor. The electric power generated during regenerative braking or generated by a power generator mounted in the vehicle is stored in the battery.

There are also some vehicles in which electric power is supplied from a power supply external to the vehicle such as a household power supply to the battery mounted in the vehicle for charging the battery. The outlet disposed in the house is coupled to the connector provided in the vehicle via a cable to supply electric power from the household power supply to the battery of the vehicle. The vehicle having a battery mounted therein and charged by the power supply provided external to the vehicle is hereinafter also referred to as a plug-in vehicle.

When a malfunction occurs in the charging system for controlling the charging power during battery charging, the battery cannot be normally charged. However, it is difficult for the user to detect the malfunction of the charging system, which requires the charging system itself to determine whether or not a malfunction occurs therein.

Japanese Patent Laying-Open No. 11-205909 (Patent Document 1) discloses a charging device for an electric vehicle for checking the operation of the ground fault interrupter when the electric vehicle is charged. The charging device for an electric vehicle disclosed in Patent Document 1 serves as a charging device for charging a battery of an electric vehicle using an external power supply, the electric vehicle including the battery, an inverter connected to the battery and an alternating-current (AC) motor connected to the inverter. The charging device for an electric vehicle includes a charging relay connecting the electric vehicle and the external power supply, a ground fault interrupter provided between the charging relay and the external power supply, and a control unit for controlling opening and closing of the charging relay. The ground fault interrupter includes a detector for detecting a short circuit of a charging circuit, a ground fault relay interrupting the charging circuit when the detector detects a short circuit, a short-circuit unit for forcefully short-circuiting the charging circuit prior to the closing operation of the charging relay. The control unit prevents the closing operation of the charging relay in the case where the ground fault relay is not interrupted even when the charging circuit is short-circuited by the short-circuit means.

According to the charging device disclosed in this document, even when the charging circuit is forcefully short-circuited prior to the charging operation, the ground fault relay is not interrupted and thus the charging circuit cannot be interrupted, in which case charging is prevented. Consequently, the charging operation can be smoothly carried out.

Furthermore, according to the disclosure in Japanese Patent Laying-Open No. 11-205909, when the electric vehicle is shifted to a charging mode, the ground fault relay is first controlled to be closed to connect an outlet to a connector on the vehicle side, and then, it is examined whether the ground fault interrupter is normally operated.

Patent Document 1: Japanese Patent Laying-Open No. 11-205909

DISCLOSURE OF THE INVENTION

Problems to be Solved by the Invention

There is, however, a case where a determination as to whether a malfunction occurs is made after the outlet is connected to the connector on the vehicle side, as with the charging device disclosed in Japanese Patent Laying-Open No. 11-205909. In this case, if the outlet is not connected to the connector on the vehicle side, for example, due to a disconnection within the cable, it cannot be determined whether a malfunction occurs in the charging system unless the cable is repaired or replaced. Accordingly, in the case where there is a failure in the cable, a malfunction of the charging system cannot be detected until the cable is repaired or replaced. This increases the time required to detect a malfunction in the charging system.

An object of the present invention is to provide a charging system allowing an immediate determination to be made as to whether a malfunction occurs in the charging system, and a method for operating the charging system.

Means for Solving the Problems

A charging system according to an aspect includes a charger that supplies, to a power storage mechanism, electric power supplied through a coupling instrument from a power supply external to a vehicle, and a control unit. The control unit operates to perform a predetermined process when the coupling instrument is connected to the vehicle in a state where the coupling instrument is connected to the power supply, and operates to perform the predetermined process before the coupling instrument is connected to the power supply, when the coupling instrument is connected to the vehicle in a state where the coupling instrument is not connected to the power supply.

According to the above-described configuration, when the coupling instrument is connected to the vehicle in the state where the coupling instrument is connected to the power supply, the predetermined process is performed. When the coupling instrument is connected to the vehicle in the state where the coupling instrument is not connected to the power supply, the predetermined process is performed before the coupling instrument is connected to the power supply. Therefore, even if the vehicle is not connected through the coupling instrument to the external power supply, the predetermined process can be performed when the coupling instrument is connected to the vehicle. Accordingly, for example, even when there is a disconnection within the coupling instrument, the process of determining whether a malfunction occurs in the charging system can be carried out before the coupling instrument is repaired or replaced. Consequently, it can be immediately determined whether a malfunction occurs in the charging system.

Preferably, the coupling instrument includes a first generation mechanism that generates a first signal when the coupling instrument is connected to the vehicle and the power supply external to the vehicle, and a second generation mechanism that generates a second signal when the coupling instrument is connected to the vehicle. A switching mechanism is provided between the power storage mechanism and the charger to switch the power storage mechanism and the charger from a disconnected state to a connected state when the second signal is generated. The control unit operates to perform the predetermined process when the power storage mechanism and the charger are switched from the disconnected state to the connected state in a state where the first signal is generated, and operates to perform the predetermined process before the first signal is generated, when the power storage mechanism and the charger are switched from the disconnected state to the connected state in a state where the first signal is not generated.

According to the above-described configuration, the first signal is generated when the coupling instrument is connected to the vehicle and the power supply external to the vehicle. The second signal is generated when the coupling instrument is connected to the vehicle. When the second signal is generated, that is, the coupling instrument is connected to the vehicle, the power storage mechanism and the charger are switched from the disconnected state to the connected state. When the power storage mechanism and the charger are switched from the disconnected state to the connected state in the state where the first signal is generated, the predetermined process is performed. Furthermore, when the power storage mechanism and the charger are switched from the disconnected state to the connected state in the state where the first signal is not generated, the predetermined process is performed before the first signal is generated. Consequently, the predetermined process can be performed when the coupling instrument is connected to the vehicle, without the need to connect the vehicle and the external power supply through the coupling instrument.

Further preferably, the first signal is a pilot signal representing a value of a current that can be supplied by the coupling instrument.

According to the above-described configuration, it can be determined using the pilot signal representing the value of the current that can be supplied by the coupling instrument whether the vehicle and the external power supply are connected to each other.

Further preferably, the second signal is a connector signal representing a state where the coupling instrument is connected to the vehicle.

According to the above-described configuration, it can be determined using the connector signal whether the coupling instrument is connected to the vehicle.

Further preferably, the switching mechanism is a relay provided within the vehicle.

According to the above-described configuration, the power storage mechanism and the charger can be disconnected from and connected to each other by opening and closing the relay.

Further preferably, the first generation mechanism is a control pilot circuit and the second generation mechanism is a switch.

According to the above-described configuration, the first signal can be generated using the control pilot circuit, and the second signal can be generated using the switch.

Further preferably, the coupling instrument is a charging cable.

According to the above-described configuration, electric power can be supplied from the external power supply through the charging cable to the vehicle.

Further preferably, the coupling instrument is an EVSE.

According to the above-described configuration, electric power can be supplied from the external power supply through the EVSE to the vehicle.

Further preferably, the power storage mechanism is a battery.

According to the above-described configuration, the electric power supplied from the power supply external to the vehicle can be supplied to the battery.

Further preferably, the predetermined process is a process of determining whether a malfunction occurs in the charging system.

According to the above-described configuration, it can be determined whether a malfunction occurs in the charging system.

BRIEF DESCRIPTION OF THE DRAWINGS

FIG. 9 is a timing chart (second) showing the state and the like of the charger.

BEST MODES FOR CARRYING OUT THE INVENTION

Figure 1:
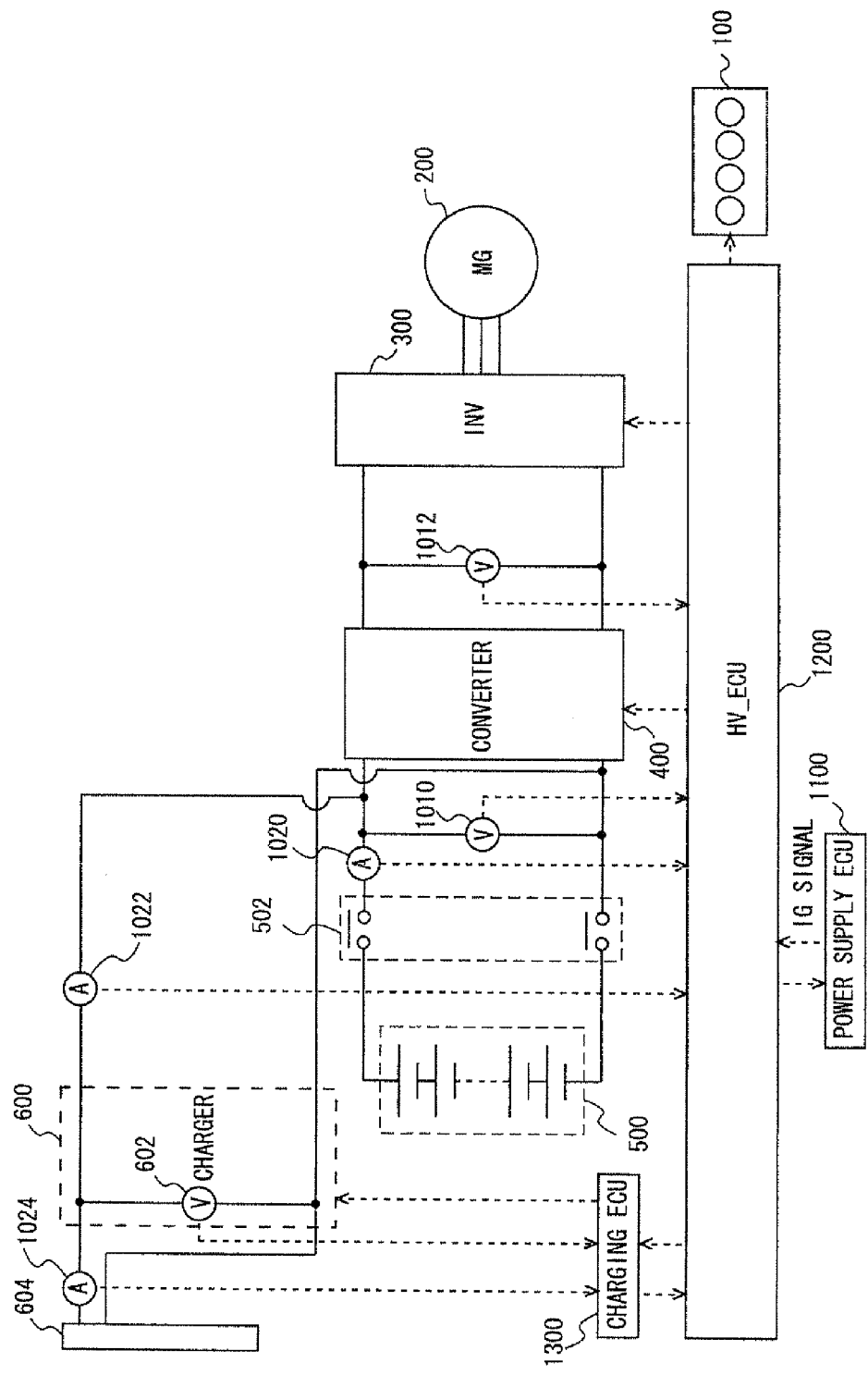
FIG. 1 is a schematic configuration diagram of a hybrid vehicle.

The embodiments of the present invention will be hereinafter described with reference to the accompanying drawings, in which the same components are designated by the same reference characters. Names and functions thereof are the same, and therefore, description thereof will not be repeated.

Referring to FIG. 1, a hybrid vehicle to which a charging system according to the embodiment of the present invention is applied will be hereinafter described. This hybrid vehicle has an engine 100, an MG (motor generator) 200, an inverter 300, a converter 400, a battery pack 500, a charger 600, a power supply ECU 1100, an HV_ECU 1200, and a charging ECU 1300. It is to be noted that the number of the ECU is not limited to three. In addition, power supply ECU 1100, HV_ECU 1200 and charging ECU 1300 may be integrally configured to form a single ECU.

The hybrid vehicle runs by driving force from at least one of engine 100 and MG 200. In place of the hybrid vehicle, an electric vehicle, a fuel-cell vehicle and the like which run only by the driving force of MG 200 may be applied.

MG 200 serves as a three-phase AC motor. MG 200 carries out a drive operation by the electric power stored in battery pack 500. The electric power converted from a direct current into an alternating current by inverter 300 is supplied to MG 200.

The driving force of MG 200 is transmitted to wheels. This causes MG 200 to assist engine 100 and the vehicle to run by the driving force from MG 200. On the other hand, during regenerative braking of the hybrid vehicle, MG 200 is driven by the wheels to thereby operate MG 200 as a power generator. Accordingly, MG 200 operates as a regenerative brake for converting braking energy into electric power. The electric power generated by MG 200 is converted by inverter 300 from an alternating current into a direct current, and then stored in battery pack 500.

Battery pack 500 serves as a battery set having a configuration in which a plurality of battery modules each having a plurality of battery cells integrated with each other are connected in series. The discharging voltage from battery pack 500 and the charging voltage to battery pack 500 are adjusted by converter 400.

Charger 600 is connected to the positive terminal and the negative terminal of battery pack 500. It is to be noted that a capacitor (condenser) may be used in place of a battery.

Charger 600 controls the voltage and the current of the electric power supplied to battery pack 500. Charger 600 supplies a direct current to battery pack 500. In other words, charger 600 converts an alternating current into a direct current. Furthermore, charger 600 boosts the voltage.

When battery pack 500 is charged, charger 600 supplies electric power to battery pack 500 from outside the hybrid vehicle. It is to be noted that charger 600 may be located outside the hybrid vehicle.

A voltage sensor 602 is provided within charger 600. The signal representing a voltage value detected by voltage sensor 602 is transmitted to charging ECU 1300. The direct-current (DC) voltage of battery pack 500 or the AC voltage of the external power supply is detected by voltage sensor 602. It is to be noted that the voltage sensor for detecting the DC voltage of battery pack 500 may be provided separately from the voltage sensor for detecting the AC voltage of the external power supply.

Charger 600 is connected to the external power supply through the charging cable connected to an inlet 604. Battery pack 500 is connected to the external power supply via charger 600.

A system main relay (SMR) 502 is provided between battery pack 500 and charger 600. When SMR 502 is opened, battery pack 500 and charger 600 are disconnected from each other. When SMR 502 is closed, battery pack 500 and charger 600 are connected to each other.

Power supply ECU 1100, HV_ECU 1200 and charging ECU 1300 will be hereinafter described. Power supply ECU 1100, HV_ECU 1200 and charging ECU 1300 are provided so as to allow communication with one another. Power supply ECU 1100, HV_ECU 1200 and charging ECU 1300 each correspond to a computer configured from a CPU (central processing unit), a ROM (read only memory), a RAM (random access memory), and the like. Power supply ECU 1100, HV_ECU 1200 and charging ECU 1300 operate with the electric power supplied from an auxiliary battery (not shown).

Power supply ECU 1100 is always activated while the electric power is supplied from the auxiliary battery. Power supply ECU 1100 controls HV_ECU 1200 to switch between the activated state and the deactivated state (the state where supply of the electric power is interrupted). HV_ECU 1200 controls activation of charging ECU 1300.

Power supply ECU 1100 transmits an IG signal to HV_ECU 1200 to thereby switch HV_ECU 1200 between the activated state and the deactivated state. When an IG_ON command is output using the IG signal, HV_ECU 1200 is activated. When an IG_OFF command is output using the IG signal, HV_ECU 1200 is deactivated.

HV_ECU 1200 receives a signal from voltage sensors 1010 and 1012 and current sensors 1020 and 1022.

Voltage sensor 1010 detects a voltage value of battery pack 500. Voltage sensor 1012 detects a system voltage value (a voltage value in the area between converter 400 and inverter 300).

Current sensor 1020 detects a value of the current discharged from battery pack 500 and a value of the current supplied to battery pack 500. Current sensor 1022 detects a value of the current supplied from charger 600 to battery pack 500.

HV_ECU 1200 calculates the state of charge (SOC) of battery pack 500 based on the values of the voltage, the current and the like input from these sensors. Since the SOC may be calculated using a well-known general technique, detailed description thereof will not be repeated. Furthermore, HV_ECU 1200 controls inverter 300, converter 400, SMR 502, and the like.

Charging ECU 1300 controls charger 600. Charger 600 receives a signal representing a value of the current detected by a current sensor 1024, in addition to the signal representing a value of the voltage detected by voltage sensor 602. Current sensor 1024 detects a value of the current (a value of the alternating current) supplied from the power supply external to the hybrid vehicle through a charging cable 700.

Figure 2:
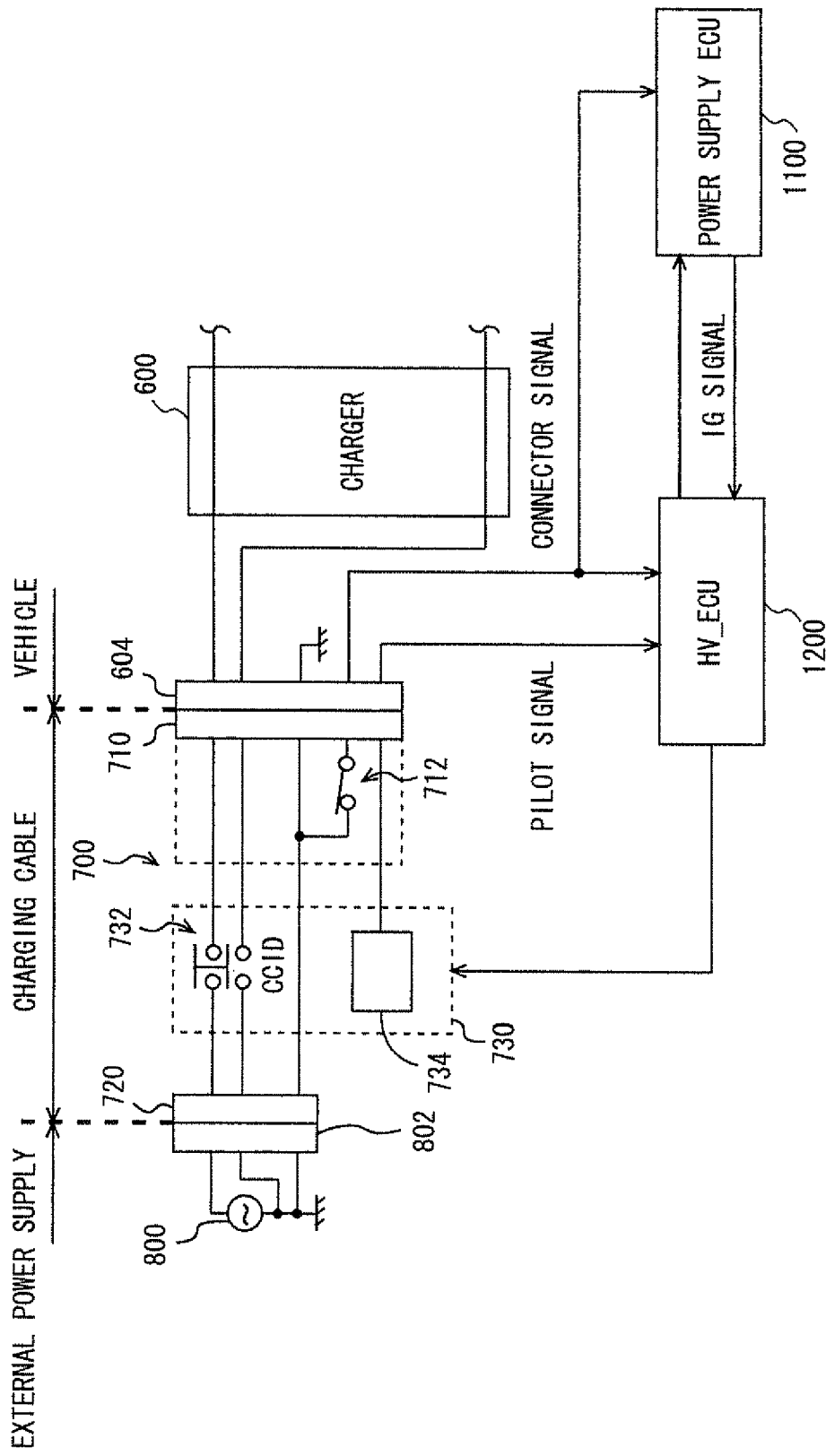
FIG. 2 is a diagram of a charging cable.

Referring to FIG. 2, charging cable 700 will then be described. Charging cable 700 includes a connector 710, a plug 720, and a CCID (charging circuit interrupt device) 730. Charging cable 700 corresponds to an EVSE (electric vehicle supply equipment).

Connector 710 of charging cable 700 is connected to inlet 604 provided on the hybrid vehicle. Connector 710 is provided with a switch 712. When switch 712 is closed in the state where connector 710 of charging cable 700 is connected to inlet 604 provided on the hybrid vehicle, power supply ECU 1100 and HV_ECU 1200 each receive a connector signal CNCT representing that connector 710 of charging cable 700 is connected to inlet 604 provided on the hybrid vehicle.

In the present embodiment, when power supply ECU 1100 and HV_ECU 1200 receive connector signal CNCT, power supply ECU 1100 activates HV_ECU 1200 which then controls SMR 502 to be closed.

Switch 712 opens and closes in coordination with an anchor fitting which anchors connector 710 of charging cable 700 to inlet 604 of the hybrid vehicle. The anchor fitting swings by the user pressing the button provided on connector 710.

Figure 3:
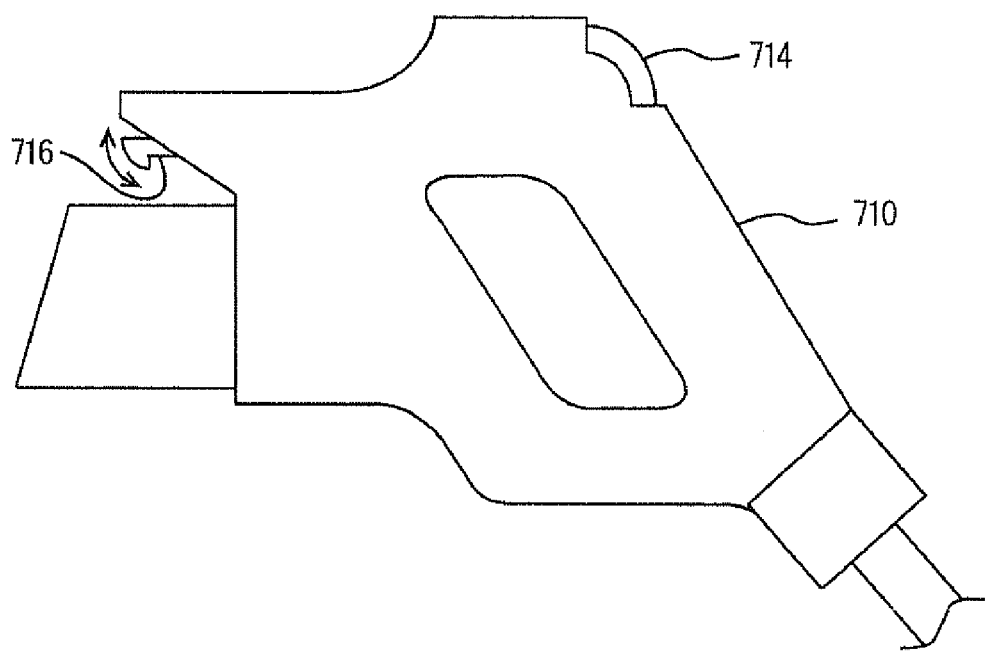
FIG. 3 is a diagram of a connector of the charging cable.

For example, when the operator moves the finger off a button 714 of connector 710 shown in FIG. 3 in the state where connector 710 of charging cable 700 is connected to inlet 604 provided on the hybrid vehicle, an anchor fitting 716 engages with inlet 604 provided on the hybrid vehicle and switch 712 is closed. When the operator presses button 714, anchor fitting 716 is disengaged from inlet 604 and switch 712 is opened. It is to be noted that the method of opening and closing switch 712 is not limited thereto.

Referring back to FIG. 2, plug 720 of charging cable 700 is connected to an outlet 802 provided in the house. Outlet 802 receives the AC electric power from a power supply 800 external to the hybrid vehicle.

CCID 730 includes a relay 732 and a control pilot circuit 734. In the state where relay 732 is opened, the path is interrupted through which the electric power is supplied to the hybrid vehicle from power supply 800 external to the hybrid vehicle. In the state where relay 732 is closed, the electric power can be supplied to the hybrid vehicle from power supply 800 external to the hybrid vehicle. HV_ECU 1200 controls the state of relay 732 in the state where connector 710 of charging cable 700 is connected to inlet 604 of the hybrid vehicle. CCID 730 is activated when plug 720 of charging cable 700 is connected to outlet 802. CCID 730 operates with the electric power supplied from power supply 800 external to the hybrid vehicle.

Control pilot circuit 734 transmits a pilot signal (square wave signal) CPLT to a control pilot line in the state where plug 720 of charging cable 700 is connected to outlet 802, that is, external power supply 800, and where connector 710 is connected to inlet 604 provided on the hybrid vehicle.

When plug 720 of charging cable 700 is connected to outlet 802, control pilot circuit 734 may output a constant pilot signal CPLT even if connector 710 is disconnected from inlet 604 provided on the hybrid vehicle. However, HV_ECU 1200 cannot detect pilot signal CPLT that is output in the state where connector 710 is disconnected from inlet 604 provided on the hybrid vehicle.

Figure 4:
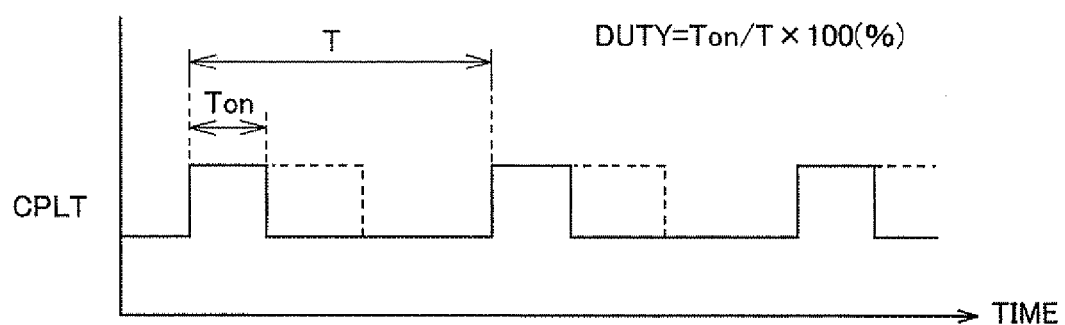
FIG. 4 is a diagram of a pilot signal CPLT.

When plug 720 of charging cable 700 is connected to outlet 802, connector 710 is connected to inlet 604 of the hybrid vehicle and the electric potential of pilot signal CPLT is lowered to a prescribed value, control pilot circuit 734 oscillates pilot signal CPLT of a predetermined pulse width (duty cycle), as shown in FIG. 4.

The hybrid vehicle is informed of the current capacity of charging cable 700 (a value of the current that can be supplied by charging cable 700) in accordance with the pulse width of pilot signal CPLT. The pulse width of pilot signal CPLT is constant independently of the voltage and the current of external power supply 800.

In the case where a different charging cable is used, the pulse width of pilot signal CPLT may vary. In other words, the pulse width of pilot signal CPLT may be set for each type of the charging cables.

Figure 5:
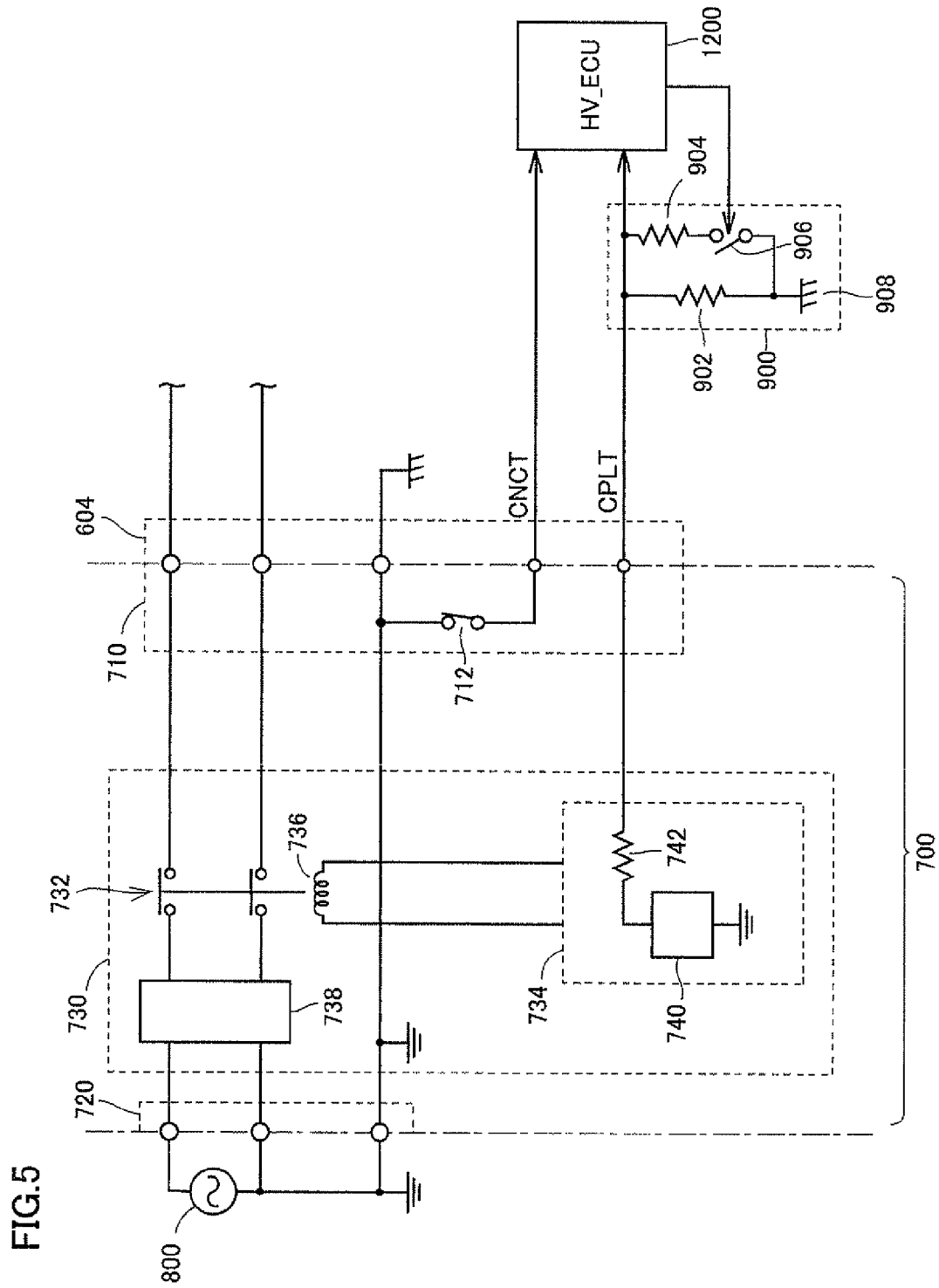
FIG. 5 is a diagram of a cm.

Referring to FIG. 5, CCID 730 will then be further described. CCID 730 includes an electromagnetic coil 736 and a ground fault detector 738 along with relay 732 and control pilot circuit 734. Control pilot circuit 734 includes an oscillator 740 and a resistance element 742.

Oscillator 740 operates with the electric power supplied from power supply 800. Oscillator 740 outputs a non-oscillating signal when the output electric potential of resistance element 742 is in the vicinity of a prescribed electric potential V1 (for example, 12V), and outputs a signal oscillated at a predetermined frequency (for example, 1 kHz) and in a predetermined duty cycle when the output electric potential of resistance element 742 is lowered below V1. In other words, when the electric potential of pilot signal CPLT is in the vicinity of V1, control pilot circuit 734 does not oscillate pilot signal CPLT. When the electric potential of pilot signal CPLT is lowered below V1, control pilot circuit 734 oscillates pilot signal CPLT at a predetermined frequency and in a predetermined duty cycle. It is to be noted that the electric potential of pilot signal CPLT is manipulated by switching a resistance value by using a resistance circuit 900 which will be described later.

Control pilot circuit 734 supplies current to electromagnetic coil 736 when the electric potential of pilot signal CPLT is in the vicinity of a prescribed electric potential V3 (for example, 6V). When electromagnetic coil 736 receives current from control pilot circuit 734, it generates electromagnetic power to cause relay 732 to be closed.

Ground fault detector 738 is provided in the power line pair for supplying charging power from power supply 800 to a plug-in hybrid vehicle. Ground fault detector 738 detects the existence of a ground fault. Specifically, ground fault detector 738 detects that the currents flowing through the power line pair in the direction opposite to each other are in equilibrium with each other. When this equilibrium is disturbed, ground fault detector 738 detects occurrence of a ground fault. When ground fault detector 738 detects a ground fault, the electric power supply to electromagnetic coil 736 is interrupted and relay 732 is turned off.

Resistance circuit 900 will be hereinafter described. Resistance circuit 900 includes resistance elements 902, 904, a relay 906, and a ground node 908. Resistance element 902 is connected between the signal line of pilot signal CPLT and ground node 908. Resistance element 904 and relay 906 are connected in series between the signal line of pilot signal CPLT and ground node 908, and connected in parallel with resistance element 902. Relay 906 is controlled by the switching signal from HV_ECU 1200.

Resistance circuit 900 switches the electric potential of pilot signal CPLT in accordance with the switching signal. In the case where relay 906 is opened, the electric potential of pilot signal CPLT is lowered to a predetermined electric potential V2 (for example, 9V) by resistance element 902. In the case where relay 906 is closed, the electric potential of pilot signal CPLT is further lowered to electric potential V3 (for example, 6V) by resistance element 904.

Figure 6:
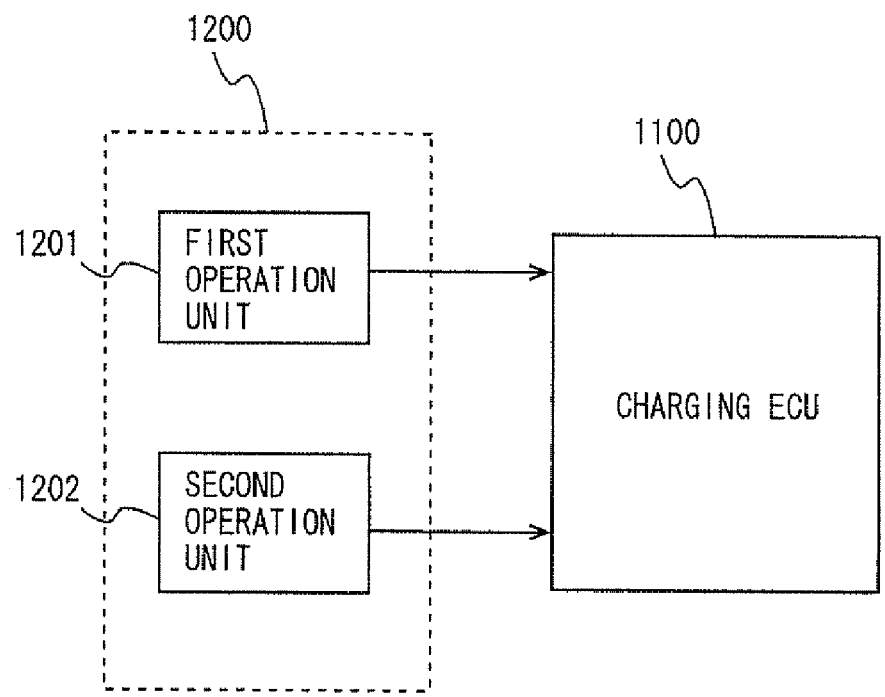
FIG. 6 is a functional block diagram of an HV_ECU.

Referring to FIG. 6, the function of HV_ECU 1200 will then be described. It is to be noted that the functions described below may be implemented by hardware or software.

HV_ECU 1200 includes a first operation unit 1201 and a second operation unit 1202.

When connector 710 of charging cable 700 is connected to inlet 604 of the vehicle in the state where plug 720 of charging cable 700 is connected to power supply 800, first operation unit 1201 establishes communication between HV_ECU 1200 and charging ECU 1300, and outputs a command to charging ECU 1300 to determine whether a malfunction occurs in charger 600. In other words, charger 600 is activated such that it can charge battery pack 500.

More specifically, when opened SMR 502 is closed in the state where pilot signal CPLT is oscillating, communication is established between HV_ECU 1200 and charging ECU 1300. Then, it is determined whether a malfunction occurs in charger 600.

For example, when the voltage detected by voltage sensor 602 is less than or equal to a threshold value (for example, 0 [V]), it is determined that a malfunction occurs in charger 600. It is to be noted that one of establishment of communication and determination of a malfunction may be carried out.

When connector 710 of charging cable 700 is connected to inlet 604 of the vehicle in the state where plug 720 of charging cable 700 is not connected to power supply 800, second operation unit 1202 establishes communication between HV_ECU 1200 and charging ECU 1300 before plug 720 of charging cable 700 is connected to power supply 800, and outputs a command to charging ECU 1300 to determine whether a malfunction occurs in charger 600.

More specifically, when opened SMR 502 is closed in the state where pilot signal CPLT is not oscillating, communication is established between HV_ECU 1200 and charging ECU 1300 before pilot signal CPLT is oscillated. Then, it is determined whether a malfunction occurs in charger 600.

Figure 7:
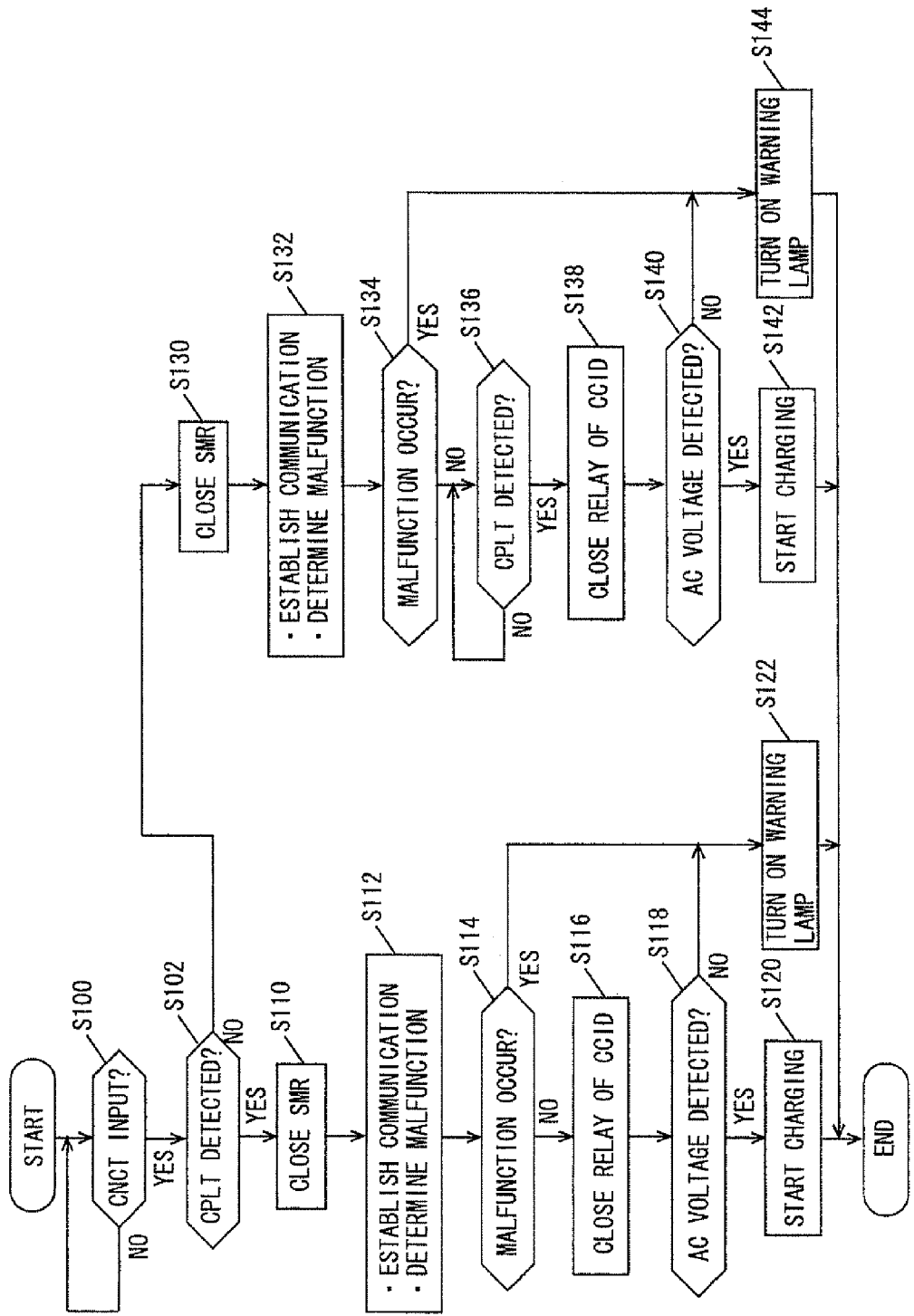
FIG. 7 is a flowchart showing the control structure of the program executed by the HV_ECU.

Referring to FIG. 7, the control structure of the program executed by HV_ECU 1200 will then be described. It is to be noted that the program described below is executed during the halt of the vehicle, for example. The program executed by charging ECU 1300 may be recorded on a recording medium such as a CD (compact disc), a DVD (digital versatile disc) and a ROM (read only memory), and introduced into the market.

In step (hereinafter abbreviated as S) 100, HV_ECU 1200 determines whether connector signal CNCT is input to the vehicle. If the connector signal is input to the vehicle (YES in S100), the process proceeds to S102. If not (NO in S100), the process returns to S100.

In S102, HV_ECU 1200 determines whether plug 720 of charging cable 700 is connected to power supply 800, that is, whether pilot signal CPLT is detected. If plug 720 of charging cable 700 is connected to power supply 800, that is, pilot signal CPLT is detected (YES in S102), the process proceeds to S110. If not (NO in S102), the process proceeds to S130.

In S110, HV_ECU 1200 causes SMR 502 to be closed. In S112, HV_ECU 1200 establishes communication with HV_ECU 1200, and outputs a command to charging ECU 1300 to determine whether a malfunction occurs in charger 600.

In S114, HV_ECU 1200 determines whether a malfunction occurs in charger 600. If a malfunction occurs in charger 600 (YES in S114), the process proceeds to S122. If not (NO in S114), the process proceeds to S116.

In S116, HV_ECU 1200 causes relay 732 of CCID 730 to be closed. In S118, HV_ECU 1200 determines whether an AC voltage is detected by voltage sensor 602 of charger 600. If the AC voltage is detected (YES in S118), the process proceeds to S120. If not (NO in S118), the process proceeds to S122.

In S120, HV_ECU 1200 starts to charge battery pack 500. In S122, HV_ECU 1200 turns on the warning lamp (not shown) provided within the vehicle. Then, the process ends.

In S130, HV_ECU 1200 causes SMR 502 to be closed. In S132, HV_ECU 1200 establishes communication with HV_ECU 1200, and outputs a command to charging ECU 1300 to determine whether a malfunction occurs in charger 600.

In S134, HV_ECU 1200 determines whether a malfunction occurs in charger 600. If a malfunction occurs in charger 600 (YES in S134), the process proceeds to S144. If not (NO in S134), the process proceeds to S136.

In S136, HV_ECU 1200 determines whether plug 720 of charging cable 700 is connected to power supply 800, that is, whether pilot signal CPLT is detected. If plug 720 of charging cable 700 is connected to power supply 800 (YES in S136), the process proceeds to S138. If not (NO in S136), the process returns to S136.

In S138, HV_ECU 1200 causes relay 732 of CCID 730 to be closed. In S140, HV_ECU 1200 determines whether an AC voltage is detected by voltage sensor 602 of charger 600. If an AC voltage is detected (YES in S140), the process proceeds to S142. If not (NO in S140), the process proceeds to S144.

In S142, HV_ECU 1200 starts to charge battery pack 500. In S144, HV_ECU 1200 turns on the warning lamp provided within the vehicle. Then, the process ends.

The operation of the charging system according to the present embodiments based on the above-described structures and flowcharts will then be described.

[Case where Charging Cable 700 is Connected to the Vehicle after it is Connected to Power Supply 800]

Figure 8:
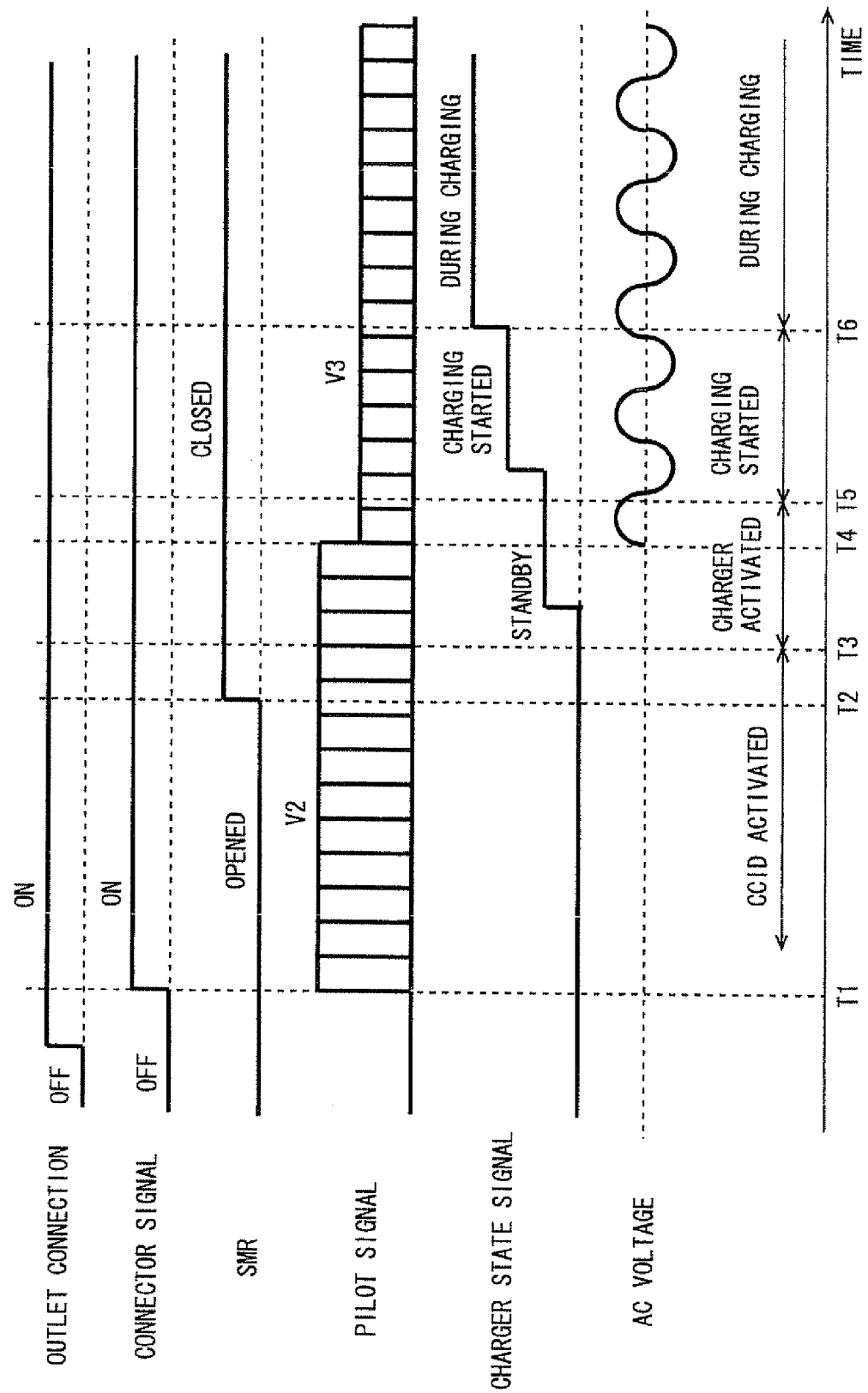
FIG. 8 is a timing chart (first) showing the state and the like of a charger.

When the user connects plug 720 of charging cable 700 to power supply 800 and then connects connector 710 of charging cable 700 to inlet 604 of the vehicle, connector signal CNCT is input to the vehicle (YES in S100) as shown at a time T1 in FIG. 8. Furthermore, since plug 720 of charging cable 700 is connected to power supply 800, CCID 730 of charging cable 700 is activated.

In this state, pilot signal CPLT is detected (YES in S102). Accordingly, at a time T2, SMR 502 is caused to be closed (S110). At a time T3, communication is established between HV_ECU 1200 and charging ECU 1300, and then, a command is issued to charging ECU 1300 to determine whether a malfunction occurs in charger 600 (S112). This causes charger 600 to be activated. When charger 600 is activated, a charger state signal showing the state of charger 600 represents "standby".

If charger 600 is normally operated (NO in S114), relay 732 of CCID 730 is brought into a closed state at a time T4 (S116). This allows power supply 800 external to the vehicle to supply electric power to the vehicle.

If an AC voltage is detected by voltage sensor 602 of charger 600 (YES in S118), electric power can normally be supplied. Consequently, charging is started at a time T5 (S120). When charging is started, the charger state signal represents "charging started". Then, the charger state signal represents "during charging" at a time T6.

If a malfunction occurs in charger 600 (YES in S114), or if an AC voltage is not detected (NO in S118), the warning lamp is turned on in order to inform the user of the malfunction (S122).

[Case Where Charging Cable 700 is Connected to the Vehicle before it is Connected to Power Supply 800]

When connector 710 of charging cable 700 is connected to inlet 604 of the vehicle before plug 720 of charging cable 700 is connected to power supply 800, connector signal CNCT is input to the vehicle at a time T11 in FIG. 9 (YES in S100). Since plug 720 of charging cable 700 is not connected to power supply 800, CCID 730 of charging cable 700 is not activated.

In this state, pilot signal CPLT is not detected (NO in S102). Accordingly, SMR 502 is caused to be closed at a time T12 (S130). At a time T13, communication is established between HV_ECU 1200 and charging ECU 1300, and then, a command is issued to charging ECU 1300 to determine whether a malfunction occurs in charger 600 (S130). In other words, before plug 720 of charging cable 700 is connected to power supply 800, communication is established between HV_ECU 1200 and charging ECU 1300, and it is determined whether a malfunction occurs in charger 600.

Consequently, even if the vehicle and external power supply 800 are not connected to each other through charging cable 700, charging cable 700 is connected to the vehicle, which allows communication to be established between HV_ECU 1200 and charging ECU 1300, with the result that it can be determined whether a malfunction occurs in charger 600.

If charger 600 is normally operated (NO in S134), it is determined whether plug 720 of charging cable 700 is connected to power supply 800, that is, whether pilot signal CPLT is detected (S136).

When pilot signal CPLT is detected at a time T14 (YES in S136), CUD 730 of charging cable 700 is activated. Furthermore, relay 732 of CCID 730 is caused to be closed at a time T15 (S138). If an AC voltage is detected by voltage sensor 602 of charger 600 (YES in S140), charging is started at a time T16 (S142).

If a malfunction occurs in charger 600 (YES in S134), or if an AC voltage is not detected (NO in S140), the warning lamp is turned on (S144).

As described above, according to the charging system of the present embodiments, when the connector of the charging cable is connected to the inlet of the vehicle in the state where the plug of the charging cable is connected to the power supply external to the vehicle, it is determined whether a malfunction occurs in the charger. If the connector of the charging cable is connected to the inlet of the vehicle in the state where the plug of the charging cable is not connected to the power supply external to the vehicle, it is determined whether a malfunction occurs in the charger before the plug of the charging cable is connected to the power supply external to the vehicle. Accordingly, even if the vehicle and the external power supply are not connected to each other through the charging cable, connecting the charging cable to the vehicle allows a determination to be made as to whether a malfunction occurs in the charger. Therefore, for example, even when there is a disconnection within the charging cable, it can be determined whether a malfunction occurs in the charger before the charging cable is repaired or replaced. As a result, it can be immediately determined whether a malfunction occurs in the charger.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

The invention claimed is:

1. A charging system comprising:
    a charger that supplies, to a power storage mechanism, electric power supplied through a coupling instrument from a power supply external to a vehicle; and
    a control unit, wherein said control unit
    operates to perform a predetermined process when said coupling instrument is connected to said vehicle in a state where said coupling instrument is connected to said power supply, and
    operates to perform said predetermined process before said coupling instrument is connected to said power supply, when said coupling instrument is connected to said vehicle in a state where said coupling instrument is not connected to said power supply.

2. The charging system according to claim 1, wherein
    said coupling instrument includes a first generation mechanism that generates a first signal when said coupling instrument is connected to said vehicle and said power supply external to said vehicle, and a second generation mechanism that generates a second signal when said coupling instrument is connected to said vehicle,
    a switching mechanism is provided between said power storage mechanism and said charger to switch said power storage mechanism and said charger from a disconnected state to a connected state when said second signal is generated, and
    said control unit
    operates to perform said predetermined process when said power storage mechanism and said charger are switched from the disconnected state to the connected state in a state where said first signal is generated, and
    operates to perform said predetermined process before said first signal is generated, when said power storage mechanism and said charger are switched from the disconnected state to the connected state in a state where said first signal is not generated.

3. The charging system according to claim 2, wherein said first signal is a pilot signal representing a value of a current that can be supplied by said coupling instrument.

4. The charging system according to claim 2, wherein said second signal is a connector signal representing a state where said coupling instrument is connected to said vehicle.

5. The charging system according to claim 2, wherein said switching mechanism is a relay provided within said vehicle.

6. The charging system according to claim 2, wherein
    said first generation mechanism is a control pilot circuit, and
    said second generation mechanism is a switch.

7. The charging system according to claim 1, wherein said coupling instrument is a charging cable.

8. The charging system according to claim 1, wherein said coupling instrument is an EVSE.

9. The charging system according to claim 1, wherein said power storage mechanism is a battery.

10. The charging system according to claim 1, wherein said predetermined process is a process of determining whether a malfunction occurs in said charging system.

11. A method for operating a charging system for supplying, to a power storage mechanism mounted in a vehicle, electric power supplied through a coupling instrument from a power supply external to the vehicle, said method comprising the steps of
    operating to perform a predetermined process when said coupling instrument is connected to said vehicle in a state where said coupling instrument is connected to said power supply; and
    operating to perform said predetermined process before said coupling instrument is connected to said power supply, when said coupling instrument is connected to said vehicle in a state where said coupling instrument is not connected to said power supply.

12. A charging system for supplying, to a power storage mechanism mounted in a vehicle, electric power supplied through a coupling instrument from a power supply external to the vehicle, said charging system comprising:
    first operation means for operating to perform a predetermined process when said coupling instrument is connected to said vehicle in a state where said coupling instrument is connected to said power supply, and
    second operation means for operating to perform said predetermined process before said coupling instrument is connected to said power supply, when said coupling instrument is connected to said vehicle in a state where said coupling instrument is not connected to said power supply.

* * * * *